UNITED STATES PATENT OFFICE 2,230,691

LUBRICANT AND LUBRICATION THEREWITH

Arthur Walther Lewis, Elizabeth, N. J., assignor to Tide Water Associated Oil Company, Bayonne, N. J., a corporation of Delaware No Drawing. Application March 11, 1937, Serial No. 130,301

9 Claims. (Cl. 252—47)

This invention relates to lubricants intended for service in the lubrication of internal combustion engines. The invention more particularly is concerned with lubricating or motor oils of mineral hydrocarbon origin which are normally corrosive toward bearing metal alloys of the character of cadmium-silver, cadmium-nickel, or copper-lead; and has, for an important objective, the inhibition or prevention of deterioration of such bearing metal in service by the corrosive action of the lubricant thereon.

Engine bearings comprising or surfaced with cadmium-silver or like alloys now are frequently employed in lieu of the more usual Babbitt metal bearings, in order to cope with extreme service conditions of friction and temperature. These conditions are the consequences of modern developments in internal combustion engines, making available high sustained speeds and requiring bearings formed of metals or alloys having greater resistance to wear, and further characterized by higher melting points necessary to prolonged life under the extreme thermal conditions existing during operation of the engine. Temperatures at the bearing surfaces during operation are much higher in the case of engines requiring these new bearings than formerly was the circumstance with engines in which Babbitt metal bearings gave satisfactory service.

Experience with bearings of the character or type exemplified by cadmium-silver, cadmium-nickel and copper-lead alloys has demonstrated, however, that their utility is greatly impaired by an extreme susceptibility to rapid deterioration by the corrosive action or effect of many available lubricating oils. Particularly has this effect been noted when the oils are of the character generally regarded as superior lubricants by conventional criteria.

Little is known concerning the nature of the corrosive action or its causes; but in general it has been observed that motor oils derived from selected crudes predominantly paraffinic in origin, as well as those oils from these or other crudes which have been improved by treatment with selective solvents, exhibit a marked tendency toward corrosion of the bearings in question, although by other tokens the lubricant is of superior quality. Oxidation stability, as indicated by sludge or acid formation in conventional tests indicative of the tendency toward deterioration of the oil itself in service, does not appear to have reliable correlation with the tendency of the oil to corrode bearing surfaces. It is possible that the high bearing surface temperatures existing under service conditions with the new bearings may be a factor in occasioning the observed deleterious effect of motor oils thereupon. It would appear, also, that the problem of bearing corrosion, with which the present invention is particularly concerned, contrasts with problems of lubricant deterioration per se, since oils characterized by long life and good stability may be just as corrosive as those of inferior grade. No theory in explanation of the observed corrosive action or the prevention thereof, as herein proposed according to the invention, is intended to be relied upon.

According to the present invention, it has now been found that the corrosive effect of lubricating oils upon bearing surfaces of the character referred to above may be avoided in novel and effective manner by incorporating with such oils particular compounds having a retarding or inhibiting effect in respect of such corrosion. More specifically, the invention arises from the discovery that a very beneficial retardation of the corrosive action of internal combustion engine lubricating oils, upon cadmium-silver, cadmium-nickel, copper-lead and like bearing metal alloys, can be effected by the addition to such oil of small amounts of compounds selected from the class of thio amides and thio anilides, which compounds are characterized by the presence of the nucleus

and conform to the general formula

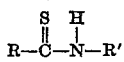

wherein R may be an alkyl, aryl or aralkyl residue and R' may be hydrogen or an alkyl, aryl or aralkyl residue.

It is, therefore, an important object of the present invention to inhibit or retard the corrosive deterioration of cadmium-silver and like bearing metal alloys in automotive service by providing a lubricant therefor comprising a refined mineral hydrocarbon oil having incorporated therewith an inhibitor of the class provided by the invention in small but effective proportion. Likewise, it is an object of the invention to improve, and to prepare improved, motor oils of petroleum origin by incorporating therein a thio amide or thio anilide in corrosion inhibiting proportions. The provision of an inhibitor effective for such purpose and comprising the aforementioned compound naturally is a major objective.

Viewed in another aspect, the invention may be regarded as encompassing a novel method of lubricating bearing metal surfaces, of the character of cadmium-silver, cadmium-nickel, copper-lead or like alloys, by applying thereto a film of lubricant comprising mineral hydrocarbon oil having incorporated therewith a small but effective proportion of a compound of the type disclosed herein. With this method of lubrication it has been found that prolonged life and consequent improved service may be attained in the use of these alloys as bearing metals for internal combustion engines, particularly when operating conditions such as high sustained speeds under load occasion unusually high bearing surface temperatures. Ordinarily, the oil selected for use, in applying the lubricating method of the invention to its intended service, will be of a character generally regarded as of superior grade and refining. Thus, the invention finds particular utility in making possible the beneficial use of such oils by avoiding deleterious consequences otherwise encountered when no preventive measures are taken against the corrosive deterioration of bearing metal alloys as hereinbefore referred to. It will be understood, however, that the invention contemplates no limitation in this respect, and that the method of lubrication herein described may be practiced in conjunction with mineral hydrocarbon lubricating oils taken as a broad class and regardless of origin.

Illustrative of compounds falling within the general class from which inhibitors according to the invention are selected may be mentioned the following:

$$CH_3.CH_2.\overset{S}{\underset{\|}{C}}-NH_2$$
Thio propionamide $$CH_3.(CH_2)_3.\overset{S}{\underset{\|}{C}}-NH_2$$
Thio valeramide $$CH_3.(CH_2)_{10}.\overset{S}{\underset{\|}{C}}-NH_2$$
Thio lauramide $$CH_3.(CH_2)_{16}.\overset{S}{\underset{\|}{C}}-NH_2$$
Thio stearamide $$CH_3.(CH_2)_3.\overset{S}{\underset{\|}{C}}-\overset{H}{\underset{|}{N}}-C_6H_5$$
Thio valeranilide $$C_6H_5-\overset{S}{\underset{\|}{C}}-\overset{H}{\underset{|}{N}}-C_5H_{11}$$
Benzamyl thio amide $$C_6H_5-\overset{S}{\underset{\|}{C}}-\overset{H}{\underset{|}{N}}-C_6H_5$$
Thio benzanilide $$C_6H_5-\overset{S}{\underset{\|}{C}}-\overset{H}{\underset{|}{N}}-C_{10}H_7$$
Benz naphthyl thio amide $$C_{10}H_7-\overset{S}{\underset{\|}{C}}-\overset{H}{\underset{|}{N}}-C_6H_5$$
Thio naphtho anilide Compounds for which the general formula $RC(S)N(H)R'$ becomes specific to alkyl-$C(S)NH_2$ may be regarded as thio amides of fatty acids; and, as indicated, the alkyl group may be either short or long chain in character. Thus, thio propionamide exemplifies thio amides of the lower fatty acids, while thio stearamide exemplifies thio amides of the higher fatty acids. The higher members of this particular series are, in a sense, to be preferred, however, in view of somewhat greater solubility in viscous hydrocarbon oils. This seems to apply likewise in the case of those compounds of the general class disclosed in which both alkyl and aryl residues are present—for examples, compounds conforming to the specific formulae alkyl-$C(S)N(H)$-aryl and aryl-$C(S)N(H)$-alkyl. When both R and R' of the general formula hereinbefore set forth represent aryl residues (for example, phenyl, naphthyl or anthryl), alkyl substituents may be present at one or more carbon atoms of a ring. Viewing the general class of compounds, from which inhibitors may be selected according to the invention, in its broad aspect my investigations indicate that compounds in which both R and R' of the general formula $RC(S)N(H)R'$ are aryl or substituted aryl residues exhibit a markedly beneficial degree of inhibiting effectiveness with respect to retarding the corrosive deterioration of cadmium-silver and like alloy bearing surfaces by hydrocarbon lubricating oils.

Effective proportions of inhibitors according to the invention will vary somewhat for different conditions of service and as between different compounds. In the great majority of cases, however, the necessary quantity of inhibitor added to the motor oil will be very small, ordinarily less than 1% by weight and frequently less than 0.5% by weight. As indicated hereinafter, proportions of the order of 0.2% by weight have proved markedly effective in achieving the objects of the invention. The stated percentages are not intended in a limitative sense, as obviously the inhibitor may be, and is intended to be, employed in any corrosion inhibiting proportion.

The tendency of motor oils to corrode bearings of the character in question may be determined by a convenient test which affords a ready method of obtaining a comparative evaluation of motor oils in the laboratory. In this test method a group of bearings, ordinarily including at least one each of several of the newer bearing metal alloys (viz: cadmium-silver, cadmium-nickel and copper-lead) is supported in a chamber in which air may circulate and the bearing surfaces are exposed for a period of 22 hours to a stream of oil sprayed under pressure continuously upon the corrodible area. The oil is maintained at a temperature of approximately 335° F. and the spray is so directed as to disperse oil over the surface of the bearings. Means are provided for re-circulating the sprayed oil so that a given quantity is used for a given test, thus simulating service conditions in an engine. The measure of corrosion is taken as the loss in weight of the bearing per unit of exposed corrodible surface.

The test method described above is carried out in the familiar Underwood corrosion apparatus supplied by the Scientific Instrument Company of Detroit, Michigan, in accordance with General Motors specifications.

Results secured utilizing the foregoing test for comparative evaluation of motor oils with and without an inhibitor according to the invention provide specific illustration of the value and inhibiting effectiveness of compounds conforming to the general formula

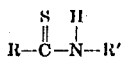

wherein R and R' have the designating significance hereinbefore described. The oil used for the tests was an S. A. E. 20 motor oil comprising a blend of well refined paraffinic base stocks and having an A. P. I. gravity of 30.1, Saybolt viscosity at 100° F. of about 300 seconds, Saybolt viscosity at 210° F. of about 54 seconds and flash point of 425° F. To portions of such an oil were added 0.2% by weight of inhibitors according to the invention. During each run cadmium-silver, cadmium-nickel and copper-lead bearings all were present; and comparative losses in weight per square decimeter due to corrosion were determined for the respective bearings.

The results obtained in four illustrative tests will suffice to demonstrate the inhibiting effectiveness of the class of compounds herein disclosed.

TEST I.—*Thio benzanilide*

| Bearing | Oil blank | Oil plus inhibitor |
|---|---|---|
| | Grams | |
| Cadmium-silver | 10.5 | No loss. |
| Cadmium-nickel | 10.1 | Do. |
| Copper-lead | 5.5 | Do. |

TEST II.—*Thio propionamide*

| Bearing | Oil blank | Oil plus inhibitor |
|---|---|---|
| | Grams | |
| Cadmium-silver | 10.3 | No loss. |
| Cadmium-nickel | 9.2 | Do. |
| Copper-lead | 5.5 | Do. |

TEST III.—*Thio stearamide*

| Bearing | Oil blank | Oil plus inhibitor |
|---|---|---|
| | Grams | |
| Cadmium-silver | 5.2 | No loss. |
| Cadmium-nickel | 5.0 | Do. |
| Copper-lead | 1.2 | Do. |

TEST IV.—*Benz amyl thio amide*

| Bearing | Oil blank | Oil plus inhibitor |
|---|---|---|
| | Grams | |
| Cadmium-silver | 6.6 | No loss. |
| Cadmium-nickel | 5.2 | Do. |
| Copper-lead | 0.9 | Do. |

Actual operation of an internal combustion engine lubricated according to the invention confirms the efficacy of inhibitors selected from the class of compounds herein disclosed. The tests were run in an eight cylinder automobile engine equipped with connecting-rod bearings of the newer type exemplified by the alloys mentioned above; and operated under carefully controlled conditions duplicated in successive runs with and without inhibitor present in the lubricating oil. New bearings carefully weighed were used for each run, and each set comprised alternate cadmium-silver and copper-lead bearings respectively. Operating conditions included an engine speed of 2850 R. P. M. under a load of 50 brake horsepower and a running period of 15 hours, this being the equivalent of 768 miles, travel at a speed of 51.2 miles per hour. Crankcase oil temperature was maintained at 300° F. and water temperature at 200° F. The oil consequently was subjected to lubricating service far more severe than that normally to be encountered in ordinary automotive use. At the end of each run the bearings were removed and again weighed, the loss in weight giving a measure of corrosion caused by the lubricant.

Tested in an engine under the foregoing conditions a S. A. E. 20 motor oil, of the character and specifications used in the laboratory evaluations hereinbefore reported, gave the following results:

| Inhibitor | Milligrams loss in weight per bearing | |
|---|---|---|
| | Cd-Ag | Cu-Pb |
| None | 3782 | 467 |
| 0.2% thio benzanilide | 257 | 85 |

The foregoing results obtained in exploratory practice of the invention under test and service conditions of accentuated severity clearly evidence the operative significance of the disclosed class of compounds as valuable additions to motor oils intended for service in the lubrication of engines equipped with cadmium-silver and like alloy bearings. Inspection of the comparative data presented in the several foregoing tables shows a substantially complete suppression of corrosion when the inhibitor is used in proportions of 0.2%. However, for many circumstances of normal automotive use it is likely that smaller percentages of inhibitor will suffice since operating conditions ordinarily encountered are not as stringent as those of the test runs herein.

While the utility of the invention has been illustrated specifically with reference to a particular motor oil, no limitation is to be inferred therefrom, and other oils, whether or not comparable in specification or origin, may be used in the lubrication of bearings of the type described in accordance with the invention.

This application includes the disclosure, and may be regarded as in part a continuation, of my co-pending application, Serial No. 114,768—filed December 8, 1936, now Patent No. 2,139,758, wherein an inhibitor comprising the compound thio benzanilide is claimed specifically.

I claim:

1. The method of lubricating bearings having substantially the corrosion susceptibility characterizing cadmium-silver, cadmium-nickel and copper-lead alloys, which consists in applying to the bearing surfaces lubricant comprising mineral hydrocarbon oil of a character normally tending to corrode said alloys and having incorporated therein corrosion inhibiting proportions of an oil soluble compound conforming to the general formula

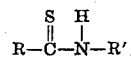

wherein R may be an alkyl, aryl or aralkyl residue and R' may be hydrogen or an alkyl, aryl or aralkyl residue.

2. The method of lubricating bearing surfaces in internal combustion engines, which bearing surfaces comprise an alloy having substantially the corrosion susceptibility characterizing cadmium-silver, cadmium-nickel, and copper-lead alloys, which consists in applying to said bearing surfaces lubricant comprising mineral hydrocarbon oil of a character normally tending to corrode said alloys and having incorporated therein corrosion inhibiting proportions of an oil soluble compound conforming to the general formula

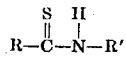

wherein R may be an alkyl, aryl or aralkyl residue and R' may be hydrogen or an alkyl, aryl or aralkyl residue.

3. In the lubrication of bearing surfaces, at least one of which is formed of an alloy having substantially the corrosion susceptibility characterizing cadmium-silver, cadmium-nickel and copper-lead alloys, with mineral hydrocarbon oil normally tending to cause substantial and rapid corrosion thereof, the method of inhibiting such corrosion, which comprises incorporating with said oil corrosion inhibiting proportions of an oil soluble compound conforming to the general formula

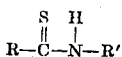

wherein R may be an alkyl, aryl or aralkyl residue and R' may be hydrogen or an alkyl, aryl or aralkyl residue.

4. The method of claim 3, further characterized in that the said compound comprises a thio amide of a fatty acid.

5. The method of claim 3, further characterized in that the said compound comprises a thio amide of a higher fatty acid.

6. The method of claim 3, further characterized in that both R and R' in the said general formula comprise aryl or substituted aryl residues.

7. The method of claim 3, further characterized in that at least one of the groups R and R' in the said general formula is an alkyl residue.

8. The method of claim 3, further characterized in that at least one of the groups R and R' in the said general formula is an aryl or substituted aryl residue.

9. The method of claim 3, further characterized in that one of the groups R and R' in the said general formula is an alkyl residue and the other is an aryl or substituted aryl residue.

ARTHUR WALTHER LEWIS.